Patented Feb. 14, 1939

2,146,720

UNITED STATES PATENT OFFICE 2,146,720

1,2-DIHALO-DELTA$^2$-CYCLOALKENES

Walter G. Christiansen, Glen Ridge, N. J., assignor to E. R. Squibb & Sons, New York, N. Y., a corporation of New York No Drawing. Application August 24, 1937, Serial No. 160,606

9 Claims. (Cl. 260—648)

Continuation in part of application Serial No. 744,198, filed September 15, 1934.

This invention relates to, and has for its object the provision of, 1,2-dihalo-delta$^2$-cycloalkenes having 5 or 6 carbon atoms in the ring. These compounds may be prepared by treating the corresponding 1,2,3-trihalo-cycloalkane with a de-hydrohalogenating agent such as potassium hydroxide, sodium hydroxide, or quinoline. These 1,2-dihalo-delta$^2$-cycloalkenes are useful as intermediates in the preparation of hypnotics.

The following examples are illustrative of the invention:

*Example 1.—1,2-dibromo-delta$^2$-cyclohexene*

100 g. (1 mol) 1,2,3-tribromo-cyclohexane [obtainable from 1-brom delta$^2$-tetrahydrobenzene (Crossley, J. Chem. Soc. 85, 1422), by adding bromine thereto to form a tribromide (Zelinsky and Gorski, Ber. 44, 2312)] and 26.5 g. (1.5 mols) of crushed potassium hydroxide are heated in a Claisen flask on the steam bath, while evacuating the system. A vigorous reaction ensues with rapid distillation at about 40 mm. The distillate is dissolved in ether, the solution dried over sodium sulfate, the ether removed, and the residual oil rectified. The 1,2-dibromo-delta$^2$-cyclohexene obtained is a colorless oil having a boiling point of 110–111° C. at 7 mm.

*Example 2.—1,2-dibromo-delta$^2$-cyclopentene*

50 g. 1,2,3-tribromo-cyclopentane [obtainable by adding HBr to cyclopentadiene to form 1-brom-delta$^2$-cyclopentene (cf. J. Chem. Soc., 85, 1422), and adding bromine thereto to form a tribromide (cf. Ber. 44, 2312)] and 12.5 g. of crushed potassium hydroxide are heated in a Claisen flask, while evacuating the system. A vigorous reaction ensues with rapid distillation at about 40 mm. The distillate is dried over calcium chloride and rectified. The 1,2-dibromo-delta$^2$-cyclopentene obtained is a colorless oil having a boiling point of 78–79° C. at 5 mm.

The invention may be variously otherwise embodied within the scope of the appended claims.

I claim:

1. 1,2-dihalo-delta$^2$-cycloalkenes having 5 to 6 carbon atoms in the ring.
2. 1,2-dibromo-delta$^2$-cycloalkenes having 5 to 6 carbon atoms in the ring.
3. 1,2-dihalo-delta$^2$-cyclopentene.
4. 1,2-dibromo-delta$^2$-cyclopentene.
5. 1,2-dihalo-delta$^2$-cyclohexene.
6. 1,2-dibromo-delta$^2$-cyclohexene.
7. The process of preparing 1,2-dihalo-delta$^2$-cycloalkenes having 5 to 6 carbon atoms in the ring, which comprises reacting the corresponding 1,2,3-trihalo-cycloalkane with a de-hydrohalogenating agent.
8. The process of preparing 1,2-dibromo-delta$^2$-cycloalkenes having 5 to 6 carbon atoms in the ring, which comprises reacting the corresponding 1,2,3-tribromo-cycloalkane with a de-hydrohalogenating agent.
9. The process of preparing 1,2-dibromo-delta$^2$-cycloalkenes having 5 to 6 carbon atoms in the ring, which comprises reacting the corresponding 1,2,3-tribromo-cycloalkane with potassium hydroxide.

WALTER G. CHRISTIANSEN.